(12) United States Patent
Nath et al.

(10) Patent No.: US 11,671,261 B2
(45) Date of Patent: Jun. 6, 2023

(54) LEDGER-BASED ARTIFICIAL INTELLIGENCE DATA STORING

(71) Applicant: Seagate Technology LLC, Fremont, CA (US)

(72) Inventors: Bijoyendra Nath, Edina, MN (US); Scott R. Warmka, Burnsville, MN (US)

(73) Assignee: Seagate Technology LLC, Fremont, CA (US)

( * ) Notice: Subject to any disclaimer, the term of this patent is extended or adjusted under 35 U.S.C. 154(b) by 276 days.

(21) Appl. No.: 17/094,387

(22) Filed: Nov. 10, 2020

(65) Prior Publication Data

US 2022/0150070 A1 May 12, 2022

(51) Int. Cl.
*H04L 29/06* (2006.01)
*H04L 9/32* (2006.01)
*G06F 16/13* (2019.01)
*H04L 9/00* (2022.01)

(52) U.S. Cl.
CPC .......... *H04L 9/3236* (2013.01); *G06F 16/134* (2019.01); *H04L 9/3265* (2013.01); *H04L 9/50* (2022.05); *H04L 2209/56* (2013.01)

(58) Field of Classification Search
CPC ....... H04L 9/3236; H04L 9/3265; H04L 9/50; H04L 2209/56; H04L 9/3239; G06F 16/134; G06F 11/3006; G06F 21/64; G06N 20/00
See application file for complete search history.

(56) References Cited

U.S. PATENT DOCUMENTS

| | | | |
|---|---|---|---|
| 11,409,990 B1* | 8/2022 | Gleich | G06Q 40/02 |
| 2019/0236598 A1* | 8/2019 | Padmanabhan | G06N 3/045 |
| 2019/0339687 A1* | 11/2019 | Celia | H02M 1/12 |
| 2019/0349185 A1* | 11/2019 | Kim | H04L 9/0637 |
| 2019/0358515 A1 | 11/2019 | Tran et al. | |
| 2020/0027010 A1* | 1/2020 | Lorenc | G06F 16/9024 |
| 2020/0252205 A1* | 8/2020 | Padmanabhan | G06F 18/214 |
| 2020/0272934 A1* | 8/2020 | Manamohan | G06F 11/1438 |
| 2020/0394471 A1* | 12/2020 | Ganapavarapu | G06N 3/08 |
| 2021/0168132 A1* | 6/2021 | Smith | H04L 63/105 |

FOREIGN PATENT DOCUMENTS

CN 110554616 12/2019

OTHER PUBLICATIONS

Nath et al., U.S. Appl. No. 16/879,175, filed May 20, 2020.

* cited by examiner

*Primary Examiner* — Taghi T Arani
*Assistant Examiner* — Lin Chang
(74) *Attorney, Agent, or Firm* — Mueting Raasch Group

(57) ABSTRACT

A system, apparatus, and method may include receiving edge device data, training a remote artificial intelligence (AI) model using the edge device data, and storing resulting remote AI model parameters in a ledger-based data structure. The ledger may also store device health data indicative of electronic device health of one or more edge devices. A ledger node may store a shared ledger. The shared ledger may use blockchain or encryption techniques and may store encrypted data, data pointers, or transfer data. The shared ledger may be accessible by at least two parties to share particular device health data.

17 Claims, 7 Drawing Sheets

LEDGER-BASED ARTIFICIAL INTELLIGENCE DATA STORING

Techniques of the present disclosure relate to data sharing health and in particular to sharing data for artificial intelligence learning.

SUMMARY

Various aspects of this disclosure relate to edge computing using distributed and collocated systems in limited control environments. Federated learning from edge devices may include storage and compute capability at the edge systems and a secure platform for the transmission of abstracted data. A ledger-based artificial intelligence (AI) data sharing system, device, or method may provide a private and permissioned ledger-based platform, which may be distributed or centralized, to provide a secure and verifiable tamper-proof, scalable platform for data flow agreed upon between multiple parties.

In one aspect, the present disclosure relates to a system including a plurality of remote learning devices operably coupled to one or more edge devices. Each remote learning device is configured to receive edge device data from at least one edge device, train a remote artificial intelligence (AI) model using the edge device data as input, and generate one or more remote AI model parameters in response to the training. The system further includes a ledger node configured to store a ledger data structure including one or more blocks. The ledger node is configured to receive the one or more remote AI model parameters from the plurality of remote learning devices, generate a new block based on the one or more remote AI model parameters, and add the new block to the ledger data structure.

In another aspect, the present disclosure relates to an apparatus including a communication interface operably configured to receive edge device data from at least one edge device. The apparatus also includes memory configured to store the edge device data. The apparatus also includes processing circuitry operably coupled to the memory and the communication interface. The processing circuitry is configured to train a remote artificial intelligence (AI) model using the edge device data as input, generate a remote AI model parameter in response to the training; and provide the remote AI model parameter to a ledger node to generate a new block of a ledger data structure based on the remote AI model parameter.

In another aspect, the present disclosure relates to a method including training a remote artificial intelligence (AI) model using edge device data from at least one edge device as input. The method also includes generating one or more remote AI model parameters in response to the training using at least one remote learning device. The method also includes generating a new block of a ledger data structure using a ledger node based on the one or more remote AI model parameters.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
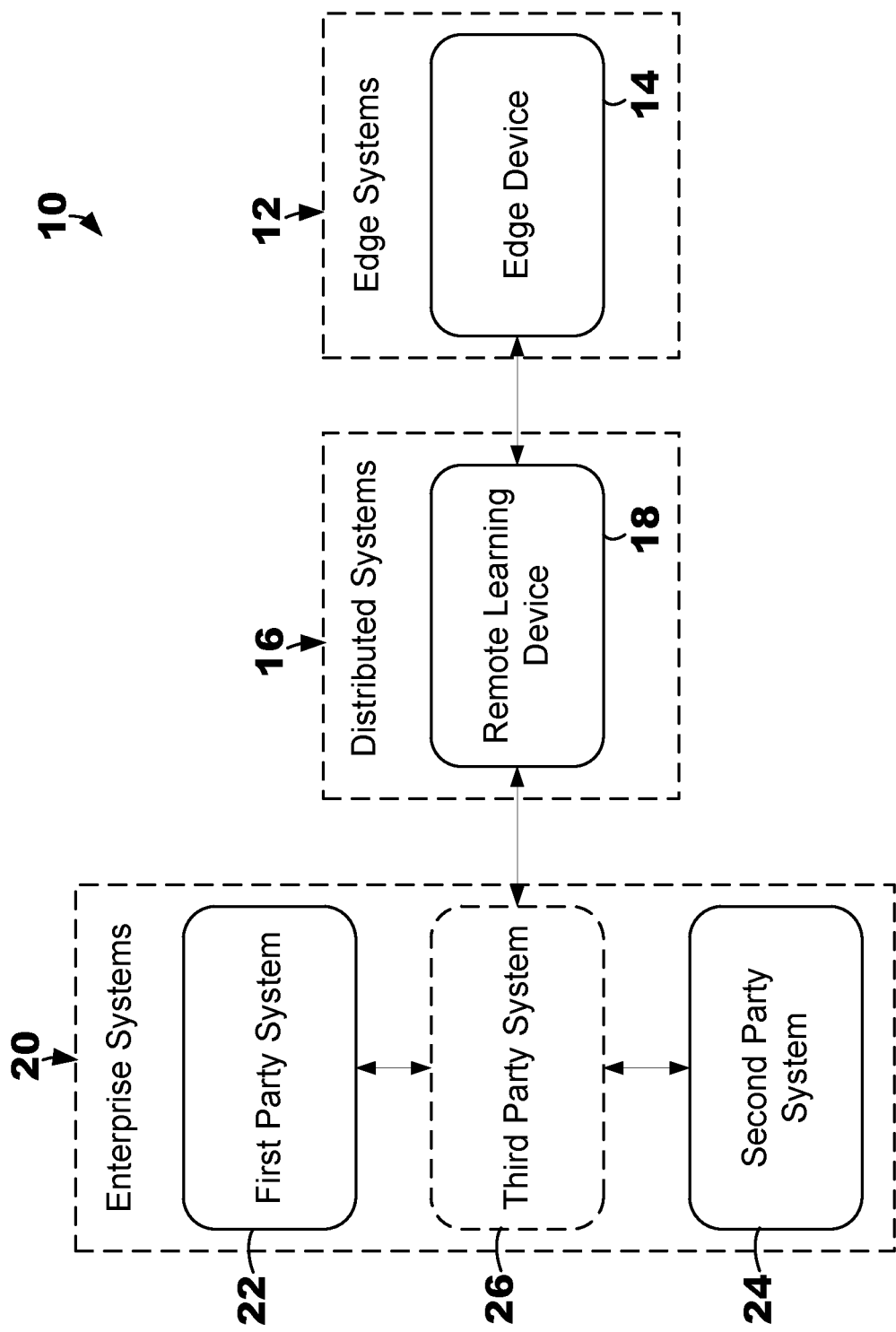
FIG. 1 is a conceptual diagram that illustrates one example of ledger-based artificial intelligence (AI) data sharing.

The present disclosure relates to device health and in particular to sharing device health data between parties. Various techniques may be used to store device health data between parties using a shared ledger to facilitate data integrity, auditability, and data security.

As used herein, a "node" or "electronic computing node" refers to an electronic computing system or device, which may include processing circuitry and memory, that is operably coupled to one or more other nodes to store or transfer data, such as a ledger, device health data, or data indicative of device health data, to form a ledger network or ledger system. A node may also be described as an electronic device node. Operable coupling may include a direct connection as part of a system, which may use a bus, or a network connection as part of a network, which may use an intranet or the internet.

A node may be managed or owned by a party, which may be described a first party, second party, or third party. A first party may be described as a user, client, customer, or enterprise. A second party may be in a contractual relationship with the first party, for example, to manage enterprise health, and may be described as a service provider, a seller, a manufacturer, or remote service. A third party may be in a contractual relationship with one or both of the first party and the third party, for example, to host a server, and may also be described as a service provider or remote service. Different parties may be separated by geographic location or by firewall.

As used herein, a "private node" refers to a node including data inaccessible to one or more other nodes in the ledger network or ledger system. In one example, a private data storage device may include sensitive user or otherwise proprietary data, which may be inaccessible to other nodes, such as a ledger node or a remote reliability analysis node described herein. In some cases, a private node is described as being owned by a first party.

As used herein, the term "inaccessible node" refers to a node that is not operably coupled to another node to allow communication with or a data transfer directly between the nodes. In some embodiments, inaccessibility may be partial and allow only particular communications or data to be transferred directly between the nodes. In one example, a configuration may prevent data on a private node from being transferred to a remote reliability analysis node, which may not even be able to communicate with or request data from the private node. Certain data, such as only device health data, from the private node may be transferred to an intermediary node, such as a ledger node. The remote reliability analysis node may access data on the intermediary node.

As used herein, the term "remote node" refers to a node that is operably coupled to another node that is part of another system or network, for example, owned by a different party or having different user access rights. In one example, a private node owned and accessible by a first party may be inaccessible by a second party. The different systems or networks may be separated by a firewall operably coupled between the nodes.

As used herein, the term "artificial intelligence parameter" refers to a parameter determined by training an artificial intelligence (AI) model and used by the AI model to generate output based on input. One example of an AI parameter is a weight in a neural network.

As used herein, the term "device health data" refers to data indicative of electronic device health. In one example, device health data may include one or more of the following: reliability data (such as S.M.A.R.T. data), usage data (performance data), and configuration data (hardware or software configuration data). In some embodiments, device health data may also be described as drive health data when the electronic device is an electronic data storage device, such as a hard disk drive, solid state drive, hybrid drive, etc.

As used herein, the term "ledger" refers to an electronic data structure that stores ledger data. Each entry to a ledger may be described as a transaction or a block (e.g., a data block). Each block may be recorded or added to the ledger. In some aspects, the ledger data includes device health data, which may or may not be encrypted. In some aspects, the ledger data includes one or more data pointers each corresponding to a location, or address, of device health data stored on a different node. A ledger may be a centralized ledger or a decentralized ledger. A centralized ledger may store all ledger data on one node. A decentralized ledger may be stored on a plurality of nodes. In particular, a decentralized ledger may store only some of or all the ledger data on each node of the plurality of nodes.

A ledger may be private or public. In general, a public ledger may be accessible, or at least readable, by any party, even though certain parts of the ledger may be encrypted or otherwise protected from extracting certain information from the ledger data. In general, a private ledger may be accessible by only certain parties. A public ledger may benefit from having more computational nodes available to facilitate processing, which may be helpful when using cryptographic techniques to implement the ledger. In general, a private ledger may be accessible by only certain parties and may facilitate more restricted access to ledger data.

As used herein, the term "blockchain" refers to a type of ledger formed using one or more blocks. Each block may be added to the blockchain in succession, for example, sequentially or one or more at a time. In general, each block may be configured to include data to facilitate verification of one or more previous blocks in the blockchain to protect against tampering. In some aspects, each block may contain a cryptographic hash of a previous one or more blocks. Each block may include stored block data and optionally a block header. Block header and stored block data may be readable by one or more other nodes in a blockchain, or ledger, network operably coupled to the node storing the blockchain. The block header may also be described as block meta data. The block header may include the cryptographic hash one or more of: a previous one or more blocks, a timestamp, and transaction data. Blocks added to the blockchain may include one or more multiple transactions.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

FIG. 1 is a conceptual diagram that illustrates one example of a ledger-based artificial intelligence (AI) data sharing system 10 according to the present disclosure. The system 10 may include one or more edge systems 12, one or more distributed systems 16, and one or more enterprise systems 20. Each system may be part of a different network separated by a firewall or even part of the same network but separated by geography (e.g., physically long distances). The delay and/or bandwidth available between the various systems may be limited in some cases.

In the context of the Internet of Things ("IoT"), edge systems 12 may be described as systems that handle or process data near the "edge" of a distributed computing topology proximate to where the data is being produced or consumed (e.g., by a consumer). Non-limiting examples of edge device data include: electronic device health data for data storage devices, vehicle service data for autonomous or semi-autonomous vehicles, surveillance data from unmanned aerial vehicles (e.g., UAVs or drones), etc.

Each edge system 12 may include one or more edge devices 14. In some embodiments, each edge system 12 includes a plurality of edge devices 14. In one example, an edge system 12 may be an autonomous or semi-autonomous vehicle, or self-driving car, that records data while driving. The vehicle data, or driving data, may be stored and provided to a distributed system 16. Each edge system 12 may be defined, for example, as all the edge devices 14 providing edge device data to the same distributed system 16.

Each distributed system 16 may include a remote learning device 18. In one example, a distributed system 16 may be a service station for autonomous vehicles. The remote learning device 18 may collect edge device data from each of the edge devices 14 of at least one edge system 12. The remote learning device 18 may be configured to store and train a remote AI model. The remote AI model may be trained using edge device data as input. Training the remote AI model may produce one or more remote AI model parameters, which may also be described as model weights. The remote AI model parameters may be used to provide particular AI model data outputs in response to particular data inputs.

Various distributed systems 16 may be distributed and collocated. Each distributed system 16 may include distributed and/or shared storage and memory within a system or between systems. The first party may not be interested in the raw data being acquired from the edge devices but rather may be interested in the abstraction of the acquisition via federated learning. Such an approach may include using compute capability at the distributed system level, and at the drive level, depending on the architecture and task of the compute requirement. Such an approach may also mitigate latency associated with passing all edge device data to the cloud.

Each distributed system 16 may be configured to provide the one or more generated remote AI model parameters to one or more enterprise systems 20. The edge device data may not be provided to the enterprise systems 20 except for, for example, device health data. In some embodiments, enterprise systems 20 may include a first party system 22, a second party system 24, and an optional third party system 26. In some embodiments, remote AI model parameters may be provided directly to the first party system 22. The first party may or may not own distributed systems 16. In the illustrated embodiment, remote AI model parameters may be provided to the third party system 26, which may be at least partially accessible by the first party and the second party. The third party may or may not own distributed systems 16. Still, in other embodiments, remote AI model parameters may be provided to the second party system 24. The second party 24 may or may not own distributed systems 16, and thus, the distributed systems 16 may be accessible by the second party 24 if owned by the second party 24 or inaccessible by the second party 24 if not owned by the second party 24. The second party system 24 may receive data from the first party system 22 or the third party system 26, such as device health data indicating health of at least one edge device 14 or at least one remote learning device 18.

The first party may be interested in a secure and tamper-proof method to transmit the abstracted data to the enterprise systems 20 from the distributed systems 16. A private ledger approach may provide access to real-time abstracted data while allowing access to only certain parties. Device health data may also be transferred and stored in a similar manner and shared with the second party.

The remote AI model parameters may be used by the first party system 22 to train a composite AI model. The composite AI model may be trained without directly receiving the edge device data. In other words, the composite AI model may not be generated or trained using the raw edge device data as inputs. Instead, the composite AI model may be generated or trained using the remote AI model parameters as inputs, thereby insulating one or more of the systems 22, 24, 26, from the raw edge device data.

In this way, the first party system 22 or other systems 24, 26, depending on the configuration, may not receive, or "see," the raw edge device data when generating the composite AI model. Because, the systems 22, 24, 26 do not receive, or "see," the raw edge device data, the raw edge device data may be secured by those that wish the raw edge device data to be secure and held in secret.

Nonetheless, in one or more configurations, one or more of the systems 22, 24, 26 may have access to (e.g., receive) the raw edge device data. For instance, the first party system 22 (e.g., by virtue of being the first party) may receive the raw edge device data for storage thereon (e.g., in a distributed ledger) while the other systems 24, 26 may not (e.g., as they may not be trusted systems). Thus, it is be understood that the raw edge device data may be described as being inaccessible by one or more of the system 22, 24, 26.

Any suitable technique for configuring the composite AI model using remote AI model parameters may be used, such as any suitable federated learning technique. The AI model may be used to facilitate machine learning. Any suitable remote AI model or composite AI model may be used.

In one or more embodiments, the composite AI model can be generated using a generic, or one-size-fits-all, approach that is agnostic, or indifferent, to the type of raw edge device data from which the remote AI mode parameters are generated. Furthermore, in this way, composite AI models for different types of data (e.g., vehicular data, storage drive health data, etc.) can be generated using the same AI engine, just with different input (e.g., remote AI model parameters for those particular different types of data). As a result, the approaches used by one or more of the systems 22, 24, 26 to generate composite AI models may not need the raw edge device data to be tailored thereto. Instead, the approaches used by one or more of the systems 22, 24, 26 to generate composite AI models may be generalized.

In one example, an automated vehicle manufacturer may be a first party that owns multiple service stations, which collect service data from multiple autonomous vehicles owned by its customers. The service data may be provided to remote AI learning models stored and trained at the service stations. Remote AI model parameters resulting from the training may be provided to the first party system 22 (or third party system 26) for storage, for example, in a ledger data structure. The remote AI model parameters may be used by the first party system 22, for example, to train a composite AI model without directly receiving the service data. Device health data from the autonomous vehicles may also be received by the service stations and provided to the first party system 22 (or third party system 26). The first party system 22 (or third party system 26) may provide data, such as device health data, to the second party system 22, which may include a device health analysis node.

In general, the ledger-based AI data sharing system 10 may allow certain parties limited access to certain data without providing access to other parties. For example, the first party may be allowed to access remote AI model parameter data and the device health data, whereas the second party may be allowed to access only the device health data, and the third party may not be allowed to access any of the data. The parties may establish an agreement defining the dataflow with the ledger data structure, which may be a private ledger. A ledger-based system may provide a verified record of actions (e.g., abstracted edge device data and device health data) across distributed systems (e.g., multiple drives within and across systems) with robust security capabilities. Actual contents of a ledger can be encrypted thereby providing secrecy as well as integrity.

Figure 2:
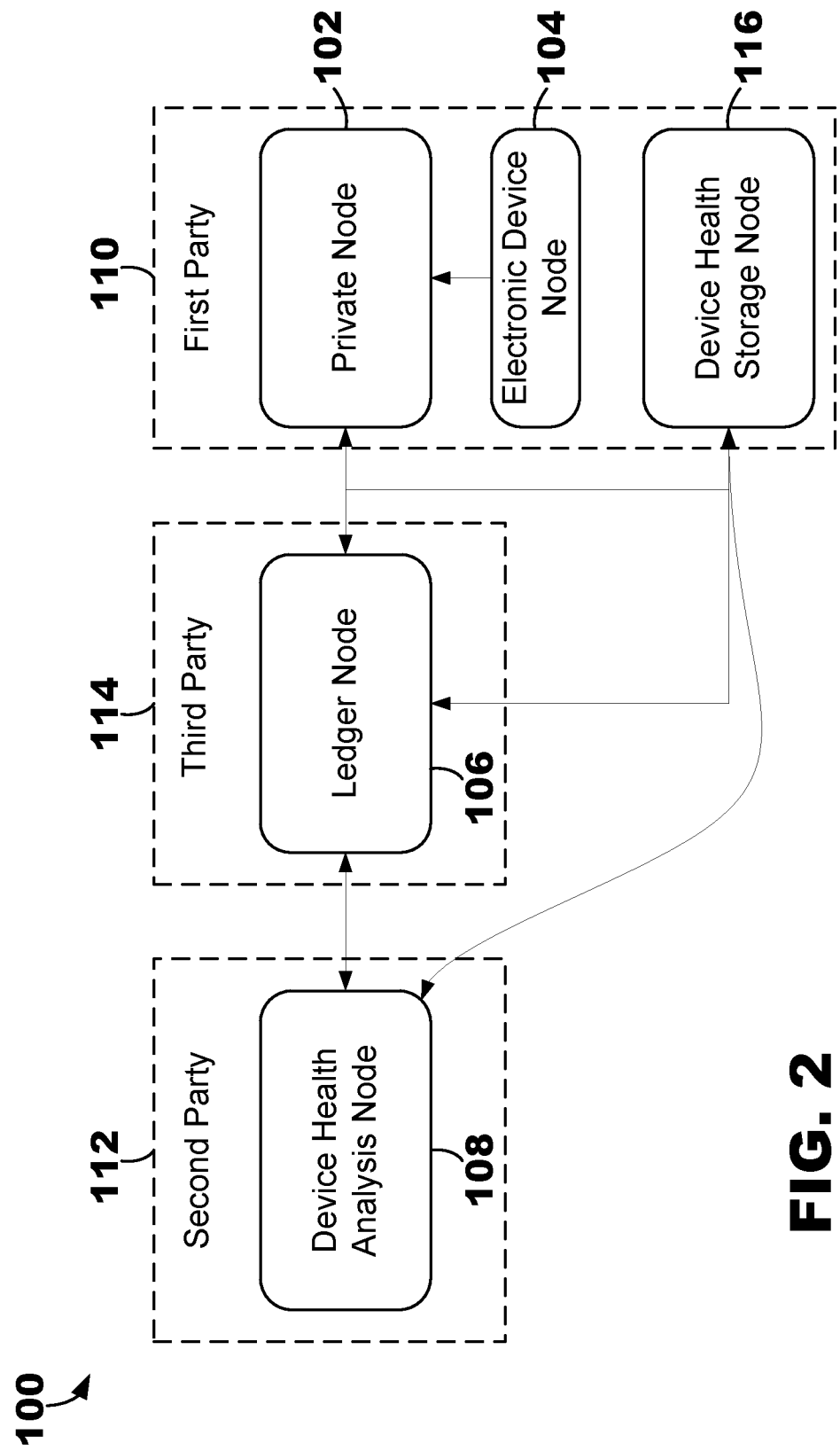
FIG. 2 is a conceptual diagram that illustrates one example of an enterprise system for ledger-based sharing including a ledger node usable in the system of FIG. 1.

FIG. 2 is a conceptual diagram that illustrates one example of a system 100 for ledger-based sharing of remote AI model parameter data and/or device health data usable in the system 10 of FIG. 1. The system 100 may include a private node 102, an electronic device node 104, a ledger node 106, a device health analysis node 108, and an optional device health storage node 116. In general, data transfer between various components of the system 100 may include one-way communication or two-way communication. The electronic device node 104 may be operably coupled to the private node 102 to transfer data, such as remote AI model parameter data and/or device health data, to the private node. The private node 102 may be operably coupled to the ledger node 106 to transfer data, such as ledger data, between the private node and the ledger node. The ledger node 106 may be operably coupled to the device health analysis node 108 to transfer data, such as ledger data, between the ledger node and the device health analysis node.

The device health storage node 116 may also be operably coupled to the private node 102, ledger node 106, and the device health analysis node 108. In some aspects, the device health storage node 116 may store device health data, which may be referenced by one or more device health data pointers stored on the ledger node 106. The device health analysis node 108 may at least read data from the ledger node 106 or the device health storage node 116.

Each component of the system 100 may be defined as being part of a network, or subsystem, corresponding to a particular party. In some aspects, the nodes may be part of least two different party networks of the system 100 (e.g., at least a first party network and a second party network. In the illustrated embodiment, the private node 102, the electronic device node 104, and the device health storage node 116 are part of a first party network 110, the device health analysis node 108 is owned by a second party network 112, and the ledger node 106 is owned by a third party network 114. In other embodiments, the ledger node 106 may be part of either the first party network 110 or the second party network 112 and a third party network 114 may not be used. In some aspects, the first party network 110 may be a customer, the second party network 112 may be an electronic device provider, and the third party network 114 may be a cloud-based provider. In other embodiments (not shown), the device health analysis node 108 may also be part of the first party network 110, which may be accessible by another node that is part of the second party network 112.

In general, the system 100 is configured to provide a shared ledger to facilitate trusted sharing of data between parties. A shared ledger may be at least read accessible by two or more parties. At least one party may be able to write to the shared ledger. In some cases, data to be shared and data to be kept private may both be stored on the electronic device node 104. The shared ledger may facilitate trusted sharing of only the data allowed to be shared while keeping the data to be kept private from being accessible by other parties.

In some aspects, the electronic device node 104 is inaccessible by one or more other nodes, such as the device health analysis node 108. In particular, in some aspects, private data stored by the electronic device node 104. At least the private data may be inaccessible by the one or more other nodes, such as the device health analysis node 108, and device health data stored by the electronic device node 104 may be accessible by the device health analysis node 108. For example, the device health analysis node 108 may be able to directly access device health data on the electronic device node 104 or indirectly access device health data through the shared ledger.

Various nodes may be configured to be in one-way communication with one another. In some aspects, data may be transferred only from the electronic device node 104 to the private node 102. The private node 102 may not be able to access any information on the electronic device node 104 that is not transmitted, or "pushed," by the electronic device node 104. In some aspects, data may be transferred only from the private node 102 to the ledger node 106. The ledger node 106 may not be able to access any information on the private node 102 that is not recorded, or "pushed," by the private node 102 to the shared ledger. In some aspects, data may be transferred only one-way from the ledger node 106 to the device health analysis node 108. The device health analysis node 108 may be configured to provide only a read request to the ledger node 106.

The private node 102 may be configured to generate device health data indicative of electronic device health. In some aspects, the device health data generated may be indicative of the health of one or more electronic devices, such as the electronic device node 104.

The ledger node 106 may be configured to store the shared ledger. The shared ledger may be a centralized ledger or a copy of a decentralized ledger. In some aspects, ledger data in the shared ledger may be stored in a blockchain. The one or more blocks of the shared ledger may include at least partial device health data, at least partial encrypted device health data, or one or more device health data pointers.

Any suitable encryption technique may be used known to one skilled in the art having the benefit of this disclosure. A non-limiting example of an encryption technique may use private and/or public key encryption. Partial encrypted device health data may be described as storing drive health data with only part of the drive health data being encrypted or storing and encrypting only part of the drive health data.

Any suitable data pointer may be used for a device health data pointer. In general, a device health data pointer may include an address indicating the location of data stored on a different node and/or in a different data structure. In some aspects, a device health data pointer may indicate an address of data in a device health data structure indicative of electronic device health, such as the device health storage node 116. The device health data structure may include one or more of the following: at least partial device health data and at least partial encrypted device health data. In some aspects, the device health storage node 116 may be described as a particular type of ledger node.

In some aspects, one or more blocks of the shared ledger may include device health transfer data. Device health transfer data may be used to track which nodes have sent or received device health data. Each block of device health transfer data may correspond to data indicative of electronic device health transferred from a source node to a destination node. In some examples, device health transfer data may include a source node address and a destination node address. Device health transfer data may also include or identify data indicative of device health being shared from the source node to the destination node.

Cryptocurrency techniques, such as digital signatures, may be used to record the transfer of (or transaction) of data from a source node to a destination node. Each respective node may be associated with a unique address or identifier (ID), which may be identified in the device health transfer data.

One or more nodes of the system 100, such as the private node 102 or the ledger node 106, may be used to generate a new block. The new block may be added to the shared ledger. In some aspects, a new block may be generated based on device health data and data corresponding to one or more blocks in the shared ledger, particularly when the ledger is a blockchain. In some aspects, a new block may be generated based on device health transfer data. Each block in the shared ledger may correspond to data from one or more electronic device nodes, such as electronic device node 104.

The device health analysis node 108 may be configured to determine a device health status, such as of one or more electronic device nodes. The device health status may be determined based on at least part of the ledger data. Non-limiting examples of a device health status include a used service life parameter or a remaining service life parameter. The used and remaining service life parameters may be determined, for example, based on a number of bits passed or time duration parameter. The time duration parameter may relate to a number of years in service or a number of powered on hours. In some aspects, the second party 112 may provide an indication to the first party 110 of the device health status, which may be used by the first party 110 to make decisions regarding the one or more electronic devices nodes 104, such as potential maintenance before failure or repairs after failure. In some cases, the device health analysis node 108 may provide the indication of the device health status (including transmission of the device health status) to a node of the system 100, such as the ledger node 106, the private 102, or the device health storage node 116.

In some aspects, when at least partial device health data is encrypted on the shared ledger on ledger node 106 or device health storage node 116, the at least partial encrypted device health data may be decrypted by the device health analysis node 108 before determining the device health status of the electronic device node 104. In some aspects, the device health analysis node 108 may use a private key for decryption, which may be shared between at least the private node 102 and the device health analysis node 108. The private key may be used by the private node 102 to generate the encrypted device health data and used by the device health analysis node 108 to decrypt the encrypted device health data.

In some aspects, the system 100 may use a shared ledger that uses a blockchain to store ledger data. The blockchain may be used to protect against tampering of information recorded to the shared ledger or to facilitate integrity of the recorded information. In particular, the blockchain may allow verification that each previous block has not been tampered. The blockchain may be audited to verify whether tampering has occurred with one or more blocks. Any suitable technique to implement the shared ledger as a blockchain may be used as known to one skilled in the art having the benefit of this disclosure. In one example, information about one or more previous blocks may be included in each new block that is added or recorded to the shared ledger and optionally cryptographically hashed, which may reduce the amount of data required to store in each block while facilitating verification.

In some aspects, the system 100 may use a shared ledger that stores information about the transfer of data between various nodes in the ledger data. A record of data transfer may facilitate ensuring information is shared to appropriate nodes. In particular, the transfer data may allow verification of which nodes received particular data and which nodes have transmitted particular data. The shared ledger including transfer data may be audited to verify that only designated nodes, for example, according to an agreement by the parties. Any suitable technique to implement the shared ledger with transfer data may be used as known to one skilled in the art having the benefit of this disclosure. In one example, each time data is transferred from one node to another node, the shared ledger may record information identifying the transferred data and a source node address and a destination node address corresponding to the transferred data.

In some aspects, the system 100 may be configured to store data different than the device health data on a shared ledger, which may facilitate security of data shared between parties using the ledger. Any suitable technique to implement storing different data on the shared ledger may be used as known to one skilled in the art having the benefit of this disclosure. In some examples, the shared ledger may include encrypted data or pointer data. Encryption or the user of pointers may prevent unauthorized users who access the shared ledger from extracting information from the shared ledger without a private key or without access to the node actually storing the data, such as the device health storage node 116, respectively.

Figure 3:
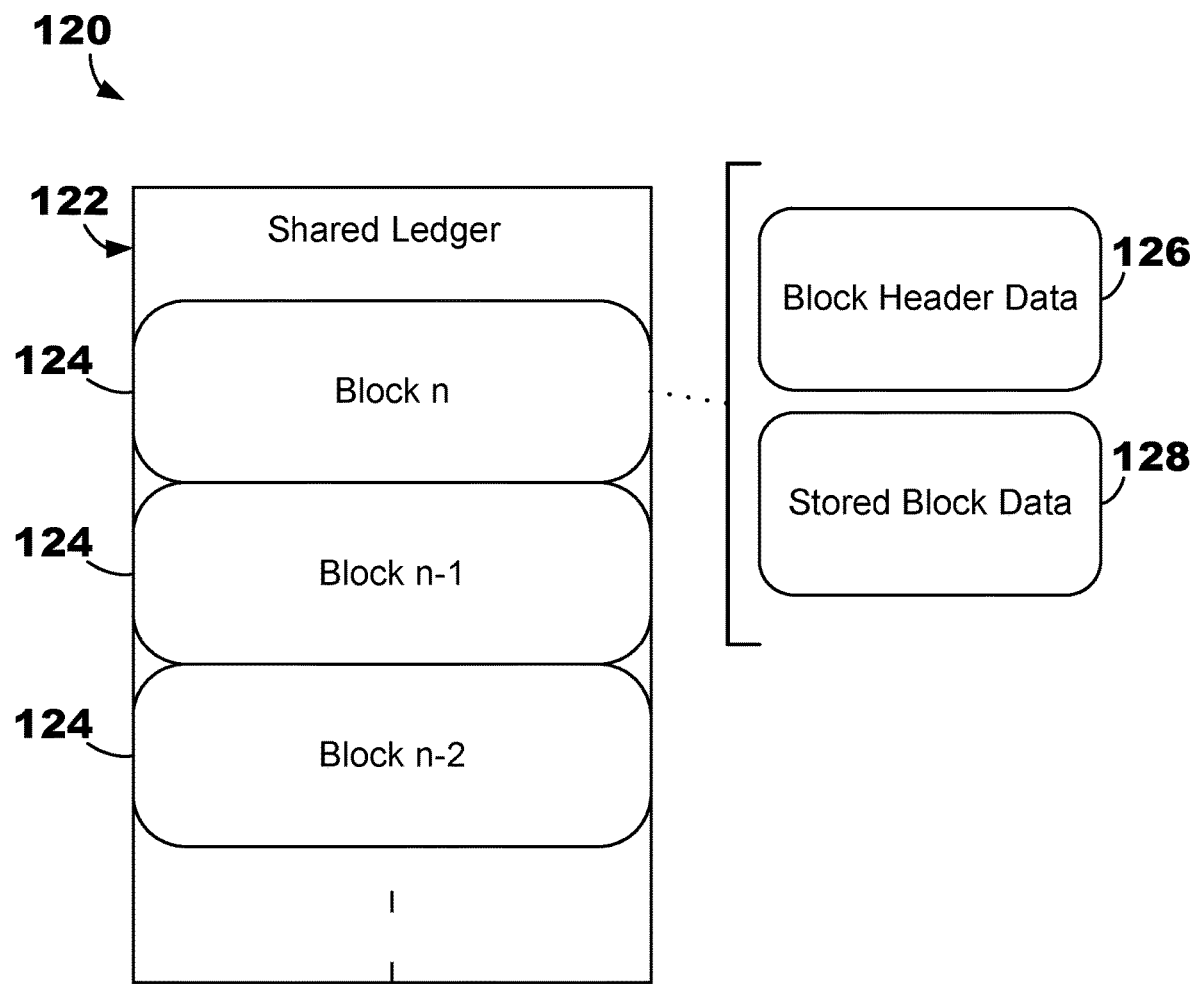
FIG. 3 is a conceptual diagram that illustrates one example of a ledger data structure that may be used to store a shared ledger usable in the system of FIG. 1.

FIG. 3 is a conceptual diagram that illustrates one example of a ledger data structure 120 that may be used to store a shared ledger 122 usable in the system 10 of FIG. 1. As illustrated, the shared ledger 122 includes a plurality of blocks 124. Each of the blocks 124 stores ledger data. In some aspects, each of the blocks 124 is added to the shared ledger 122 one block at a time. For example, the blocks 124 may be added using a suitable blockchain technique.

Each of the blocks 124 may include various types of data. Some types of data may be described as block header data 126, or meta data. Another type of data may be described as stored block data 128. The stored block data 128 of each block 124 may include device health data.

In some aspects, two or more blocks 124 may be added to the shared ledger 122 concurrently in a pool, which may be described as a block pool. The block pool may share a single entry of block header data 126 relating to all the blocks 124 in the block pool. Once recorded, each of the blocks 124 may be addressed individually, even when recorded together in a pool.

In some aspects, the device health data may include drive health data, such as drive reliability data. Non-limiting examples of drive reliability data include S.M.A.R.T. data, a timestamp corresponding to when the S.M.A.R.T. data was generated, and a unique address or ID. The address or ID may include one or more of the following: a device ID of the respective electronic device, a subsystem ID associated with one or more electronic devices, a rack ID associated with one or more subsystems, or a datacenter ID associated with one or more racks. In some aspects, the address or ID may mask the physical location of the drive. For example, the address or ID may be a serial number or arbitrary ID, which may be associated with one or more other IDs in a database.

The block header data 126 of each block 124 may include various suitable information about one or more of the blocks. In some aspects, the block header data 126 may include one or more of the following: a previous block ID, a stored block ID, a current time (or timestamp), and a mining parameter.

A previous block ID may include a unique ID for one or more blocks already stored in the shared ledger 122. The previous block ID may be a cryptographic hash of some or all stored block data 128 and/or block header data 126 of the one or more blocks already stored in the shared ledger 122.

The stored block ID may include a unique ID for the block to be stored, or being stored, in the shared ledger 122. The block ID may be a cryptographic has of some or all stored block data 128 and/or other block header data 126 of the block to be stored, or being stored, in the shared ledger 122.

The current time, or timestamp, may include a time corresponding to when the stored block data 128 was generated, for example, by the electronic device node 104 (FIG. 2). The current time may also include a time corresponding to when the block to be stored, or being stored, is recorded to the shared ledger 122.

A mining parameter may include a target value, a nonce value, and a ledger update interval. These parameters may individually or cooperatively establish a difficulty for mining encrypted portions of the shared ledger 122.

Figure 4:
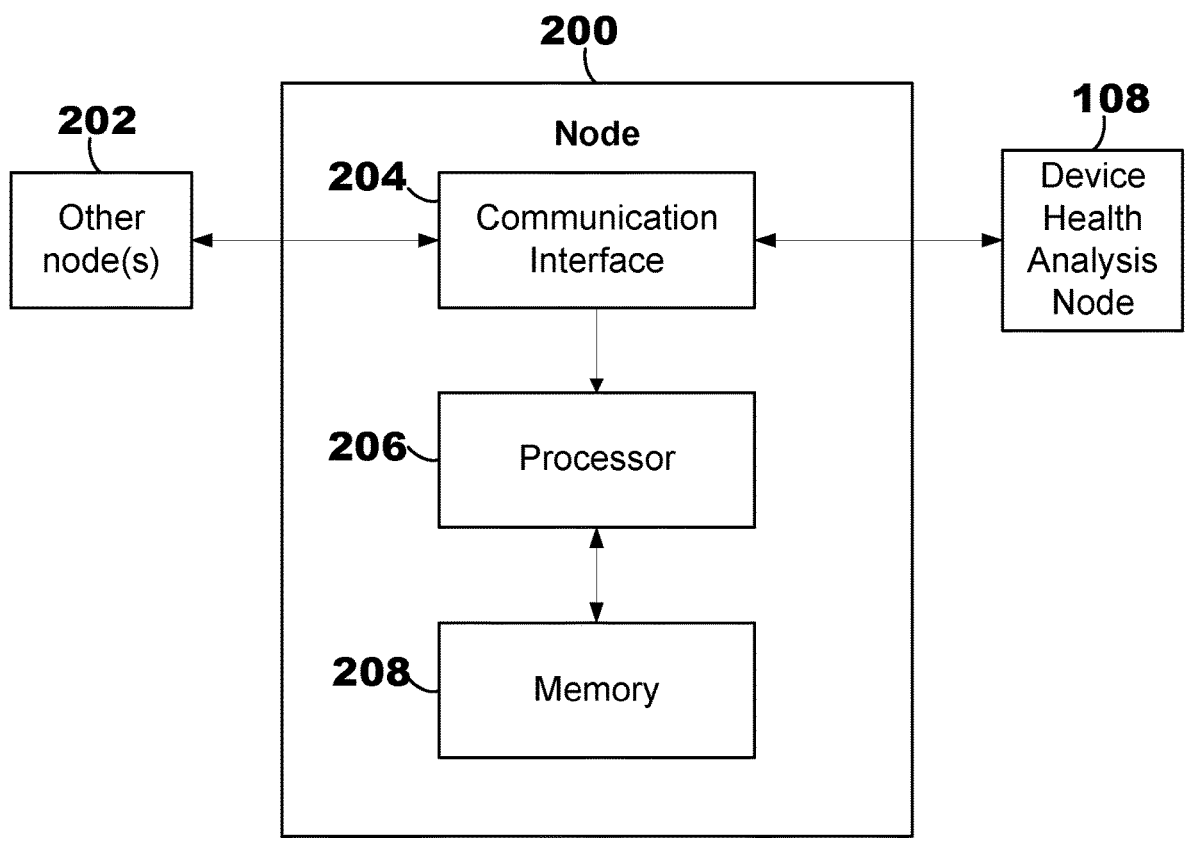
FIG. 4 is a conceptual diagram that illustrates one example of a node usable in the system of FIG. 1.

FIG. 4 is a conceptual diagram that illustrates one example of a node 200 usable in the system 10 of FIG. 1. The node 200 may be operably coupled to one or more other nodes 202. The node 200 may be operably coupled to the device health analysis node 108. The node 200 may be configured to transfer data to and from the one or more second nodes 202 and the device health analysis node 108. Each of the one or more other nodes 202 and the device health analysis node 108 may also be configured similarly to the node 200.

The node 200 may include one or more components to carry out various functionality. The node 200 may include a communication interface 204, a memory 208, and a processor 206 operably coupled to the communication interface 204 and the memory 208. Data may be provided from and received by the node 200 through the communication interface 204 in any suitable manner to one or more nodes. The processor 206 may process data in the memory 208 and/or data received by the communication interface 204, after which processed data may be provided back to the memory 208 or to the communication interface 204 to be provided to another node. The memory 208 may provide data to or store data from the processor 206, which may be processed or passed on by the processor 206 to the communication interface 204 or returned to the memory 208.

In some aspects, the node 200 may be configured to store a shared ledger 122 (FIG. 3), or a copy of the shared ledger, in memory 208. The shared ledger 122 may be accessed for reading by some or all of the one or more other nodes 202 or the electronic device node 108 using the communication interface 204 and the processor 206.

Data may be recorded to the shared ledger 122 by some or all of the one or more other nodes 202 or the electronic device node 108 using the communication interface 204 and the processor 206. In some embodiments, the electronic device node 108 is not able to record data to the shared ledger 122. In some aspects, the read or record access rights to the shared ledger 122 may be stored in the shared ledger 122 or in another data structure within the memory 208.

When recording one or more new blocks 124 (FIG. 3) to the shared ledger, the processor 206 may determine the block header data 126 (FIG. 3) to be recorded with the one or more blocks. The processor 206 may also generate a block pool based on two or more blocks 124.

In general, the functionality of systems and nodes described herein may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other devices and/or methods as described herein or as would be applied in a known fashion. In view of the above, it will be readily apparent that the functionality as described herein may be implemented in any manner known to one skilled in the art having the benefit of the present disclosure.

One or more of the components of the system 100 (FIG. 2), such as a node, described herein may include a processor, such as a central processing unit (CPU), computer, logic array, or other device capable of directing data coming into or out of the respective node or system. In some aspects, the node may also be referred to as a controller. The node or controller may include one or more computing devices having memory, processing, and communication hardware. The node may include circuitry used to couple various components of the node together or with other components operably coupled to the node. The functions of the node may be performed by hardware and/or as computer instructions on a non-transient computer readable storage medium.

The processor 206 of the node 200 may include any one or more of a microprocessor, a microcontroller, a digital signal processor (DSP), an application specific integrated circuit (ASIC), a field-programmable gate array (FPGA), and/or equivalent discrete or integrated logic circuitry. In some examples, the processor 206 may include multiple components, such as any combination of one or more microprocessors, one or more controllers, one or more DSPs, one or more ASICs, and/or one or more FPGAs, as well as other discrete or integrated logic circuitry. The functions attributed to a node or processor herein may be embodied as software, firmware, hardware, or any combination thereof. While described herein as a processor-based system, an alternative node could utilize other components such as relays and timers to achieve the desired results, either alone or in combination with a microprocessor-based system.

Figure 5:
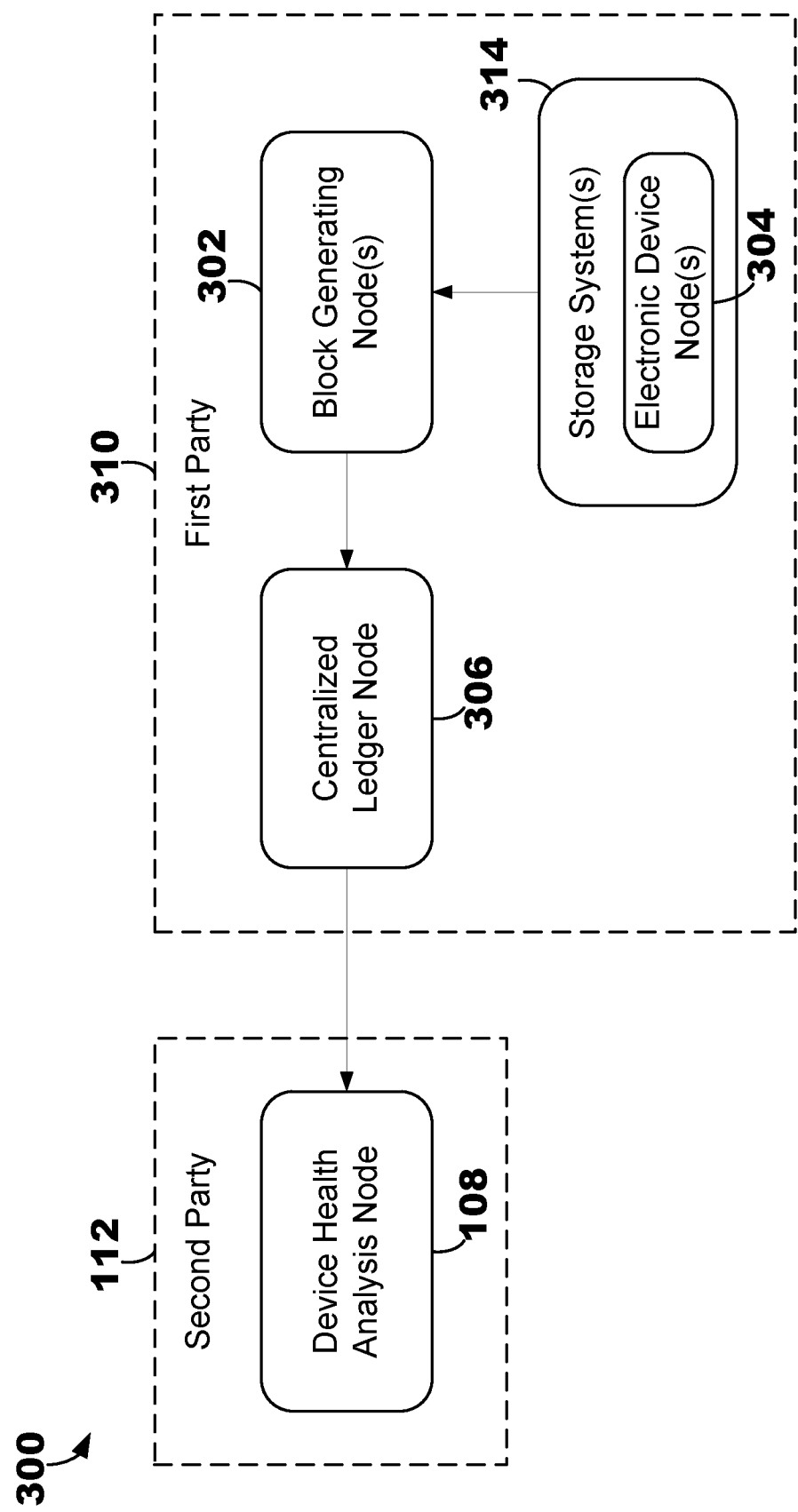
FIG. 5 is a conceptual diagram that illustrates one example of a centralized system usable to configure the system of FIG. 2.

FIG. 5 is a conceptual diagram that illustrates one example of a centralized system 300 usable to configure the system 100 of FIG. 2. In general, the system 100 may be partially or fully centralized. In the illustrated embodiment, many of the parts and components depicted in FIG. 5 are the same or similar to those depicted in, and described with regard to, FIG. 2 Reference is made to the discussion above regarding FIG. 2 for numbered elements depicted in, but not specifically discussed with regard to, FIG. 5.

The centralized system 300 may include one or more block generating nodes 302, one or more electronic devices 304, a centralized ledger node 306, and the device health analysis node 108. In general, data transfer between various components of the centralized system 300 may include one-way communication or two-way communication. Each of the electronic devices 304 may be operably coupled to at least one block generating nodes 302 to transfer data, such as remote AI model parameter data and/or device health data, to at least one block generating node 302.

Each block generating node 302 may be operably coupled to the centralized ledger node 306 to transfer data, such as ledger data, from the block generating node 302 to the centralized ledger node 306. The centralized ledger node 306 may be operably coupled to the device health analysis node 108 to transfer data, such as ledger data, from the centralized ledger node 306 to the device health analysis node 108.

In some aspects, the one or more electronic devices 304 may provide the device health data to the block generating node 302 directly. In other aspects, device health data from each electronic device 304 may be generated and provided to system-level processing circuitry of a respective storage system 314. Each storage system 314 may be logically associated with, or defined as, one subsystem in a rack, multiple subsystems in a rack, one rack in a datacenter, or multiple racks in one or more datacenters. For example, the first party 310 may include one or more datacenters including one or more storage systems 314 and one or more electronic devices nodes 304. Different parties and different datacenters may be separated by geographic location or by firewall. The one or more electronic devices 304 may each be part of a storage system 314. In some aspects, each storage system 314 may include a plurality of electronic devices 304. At least one of the block generating nodes 302 may record the device health data, which may be encrypted, or may record pointers to device health data, to a shared ledger on the centralized ledger node 306.

The block generating nodes 302 may not be part of a storage system 314 (e.g., part of a different subsystem, rack, or datacenter). As such, each block generating node 302 may receive device health data from one or more electronic device nodes 304 or even from one or more storage systems 314.

In a fully centralized system, the only shared ledger may reside on the centralized ledger node 306. In partially centralized system, one or more copies of the shared ledger may also be replicated and stored elsewhere, for example, on one or more of the block generating nodes 302. In some cases, whether the system is fully centralized may depend on available processing resources and related considerations, such as transaction time or ledger size.

In the illustrated embodiment, the one or more block generating nodes 302, one or more electronic devices 304, and centralized ledger node 306 are part of a first party network 310. The shared ledger may be stored within the first party network 310. The device health analysis node 108 may be part of the second party network 112. Devices on the second party network 112 may have only read access to the shared ledger on the centralized ledger node 306. The second party network 112 may be unable to access any other data on the first party network 310, such as private data on the electronic device nodes 304.

Figure 6:
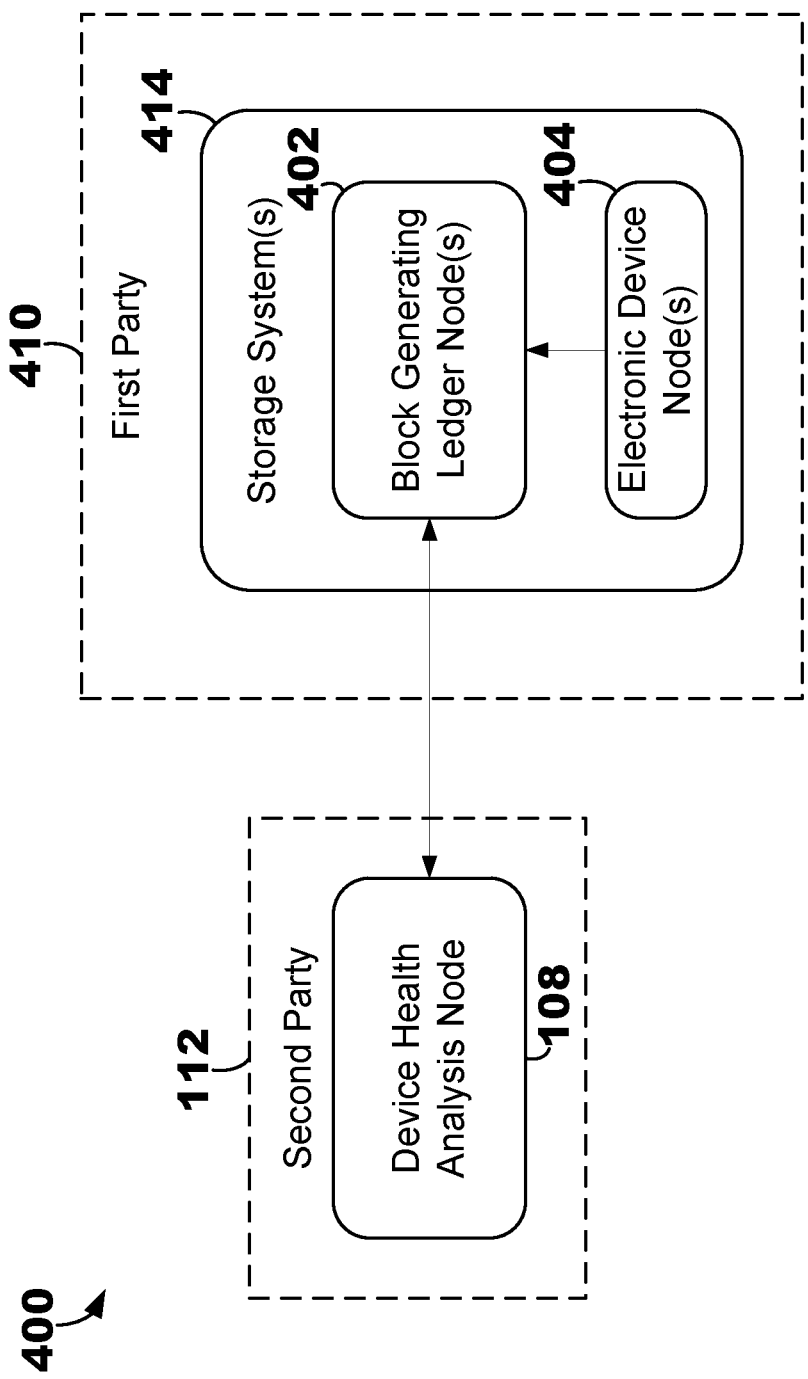
FIG. 6 is a conceptual diagram that illustrates one example of a decentralized system usable to configure the system of FIG. 2.

FIG. 6 is a conceptual diagram that illustrates one example of a decentralized system 400 usable to configure the system 100 of FIG. 2. In general, the system 100 may be partially or fully decentralized. In the illustrated embodiment, many of the parts and components depicted in FIG. 6 are the same or similar to those depicted in, and described with regard to, FIGS. 2 and 5. Reference is made to the discussion above regarding FIGS. 2 and 5 for numbered elements depicted in, but not specifically discussed with regard to, FIG. 6. The decentralized system 400 differs from the centralized system 300 (FIG. 5), for example, in that the decentralized system 400 includes block generating ledger nodes 402, which may store a copy of the shared ledger. The block generating nodes 302 (FIG. 5) of the centralized system 300 may not store a copy of the shared ledger.

The decentralized system 400 may include one or more block generating ledger nodes 402, one or more electronic devices 404, and the device health analysis node 108. In general, data transfer between various components of the decentralized system 400 may include one-way communication or two-way communication. The one or more electronic devices 404 may be operably coupled to the one or more block generating ledger nodes 402 to transfer data, such as remote AI model parameter data and/or device health data, to the one or more block generating ledger nodes 402. The one or more block generating ledger nodes 402 may be operably coupled to the device health analysis node 108 to transfer data, such as ledger data, from the one or more block generating ledger nodes 402 to the device health analysis node 108.

In some aspects, each of the one or more storage systems 414 may include one or more one or more electronic devices 404. Device health data generated by the one or more electronic devices 404 may be provided to the one or more block generating ledger nodes 402.

In the illustrated embodiment, each of the one or more storage systems 414 also includes one or more block generating ledger nodes 402. Each block generating ledger node 402 may receive device health data from one or more electronic device nodes 304 or even from one or more storage systems 414.

Each of the one or more block generating ledger nodes 402 may store a copy of the shared ledger and may provide the device health data to the device health analysis node 108. The one or more block generating ledger nodes 402 may record the device health data, which may be encrypted, or may record pointers to device health data, to the copy of the shared ledger.

In a fully decentralized system, every block generating ledger node 402 may replicate and store a copy of the shared ledger. In partially decentralized system, the shared ledger may only be replicated and stored on some of the block generating ledger nodes 402 (e.g., at least two or more) and optionally on a centralized ledger node also. In some cases, whether the system is fully decentralized may depend on available processing resources and related considerations, such as transaction time or ledger size.

In the illustrated embodiment, the one or more block generating ledger nodes 402 and the one or more electronic devices 404 are part of a first party network 410. The shared ledger may be stored within the first party network 410. The device health analysis node 108 may be part of the second party network 112. Devices on the second party network 112 may have only read access to the shared ledger on the one or more block generating ledger nodes 402. The second party network 112 may be unable to access any other data on the first party network 410, such as private data on the electronic device nodes 404.

Figure 7:
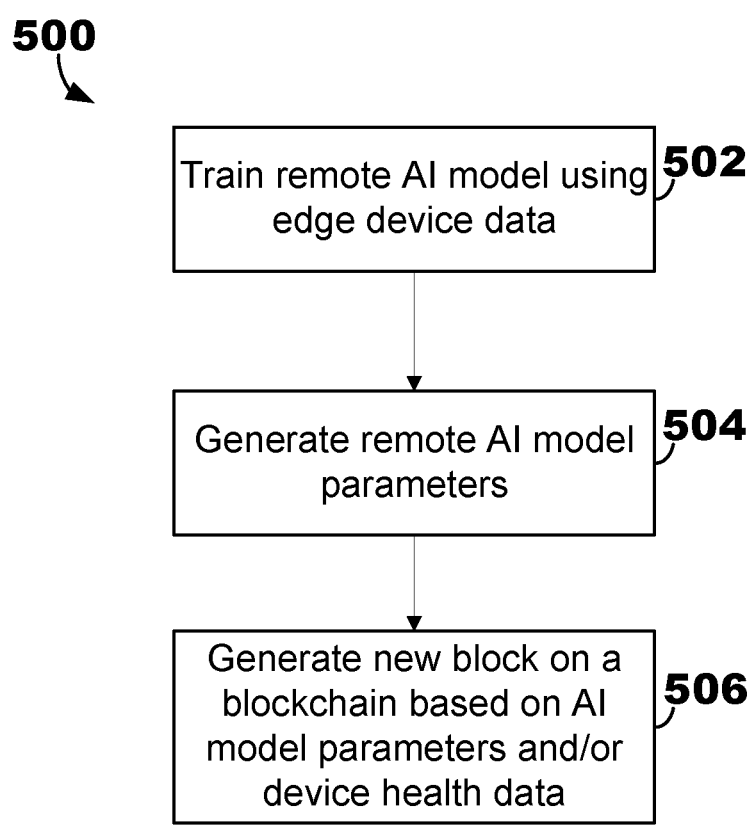
FIG. 7 is a flow diagram that illustrates one example of a ledger-based AI data sharing method usable with the system of FIG. 1.

FIG. 7 is a flow diagram that illustrates one example of a ledger-based AI data sharing method 500 usable with the system 10. As illustrated, the method 500 may include training a remote AI model using edge device data in block 502. The method 500 may include generating remote AI model parameters, or weights, in block 504. The method 500 may include generating a new block in a blockchain based on AI model parameters and/or device health data in block 506. The device health data may indicate the health of an edge device and/or a remote learning device.

In some embodiments, existing data in the shared ledger may be used to generate each new block. Such a technique may facilitate determining data in the ledger has been altered.

In some embodiments, device health sharing data, including at least an address of a source node and/or a destination node and an ID of the data to be stored, to track transfers of data between the nodes may be used to generate each new block. This record of transferred data may be used to determine which nodes have held the data. Use of a digital signature for each node, or other related cryptocurrency techniques known to one skilled in the art having the benefit of the present disclosure, may also be used.

In some embodiments, an encryption or pointer technique may be used to generate each new block. The new block may include encrypted device health data or one or more device health data pointers. In general, the use of encrypted data or data pointers may facilitate further security of data stored in the ledger. For example, unauthorized users may not be able to decrypt data retrieved from the ledger or access the data structure indicated by the data pointers.

Thus, various embodiments of LEDGER-BASED ARTIFICIAL INTELLIGENCE DATA SHARING are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety for all purposes, except to the extent any aspect directly contradicts this disclosure.

All scientific and technical terms used herein have meanings commonly used in the art unless otherwise specified. The definitions provided herein are to facilitate understanding of certain terms used frequently herein and are not meant to limit the scope of the present disclosure.

The terms "coupled" or "connected" refer to elements being attached to each other either directly (in direct contact with each other) or indirectly (having one or more elements between and attaching the two elements). Either term may be replaced to "couplable" or "connectable" to describe that the elements are configured to be coupled or connected. In addition, either term may be modified by "operatively" and "operably," which may be used interchangeably, to describe that the coupling or connection is configured to allow the components to interact to carry out functionality.

As used herein, the term "configured to" may be used interchangeably with the terms "adapted to" or "structured to" unless the content of this disclosure clearly dictates otherwise.

The singular forms "a," "an," and "the" encompass embodiments having plural referents unless its context clearly dictates otherwise.

The term "or" is generally employed in its inclusive sense, for example, to mean "and/or" unless the context clearly dictates otherwise. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A system comprising:
   a plurality of remote learning devices operably coupled to one or more edge devices, each remote learning device comprising a processing circuitry, a memory, and a communication interface, and is configured to:
   receive edge device data, using the communication interface, from at least one edge device,
   train, using the processing circuitry and the memory, a remote artificial intelligence (AI) model using the edge device data as input, and
   generate, using the processing circuitry and the memory, one or more remote AI model parameters in response to the training; and
   a ledger node configured to store a ledger data structure comprising one or more blocks, the ledger node configured to:
   receive the one or more remote AI model parameters from the plurality of remote learning devices,
   generate a new block based on the one or more remote AI model parameters, and add the new block to the ledger data structure,
   wherein the edge device data received by the plurality of remote learning devices is inaccessible by the ledger node.

2. The system of claim 1, wherein the ledger node is configured to generate a composite AI model based on the one or more remote AI model parameters stored in the ledger data structure.

3. The system of claim 1, wherein generating the new block is further based on data corresponding to one or more blocks in the ledger data structure.

4. The system of claim 1, wherein the new block is generated further based on transfer data corresponding to the transfer of data from a source node to a destination node, the transfer data comprising: a source node address and a destination node address.

5. The system of claim 1, wherein each remote learning device is further configured to encrypt the one or more remote AI model parameters and send one or more encrypted remote AI model parameters to the ledger node to generate the new block.

6. The system of claim 1, wherein the new block is generated further based on device health data indicating health of at least one edge device or at least one remote learning device.

7. The system of claim 6, further comprising a device health analysis node, wherein the ledger node is configured to send at least part of the ledger data structure including the device health data to the device health analysis node remote from the ledger node, the plurality of remote learning devices being inaccessible by the device health analysis node.

8. An apparatus comprising:
   a communication interface operably configured to receive edge device data from at least one edge device;
   memory configured to store the edge device data; and
   processing circuitry operably coupled to the memory and the communication interface, the processing circuitry configured to:
   train a remote artificial intelligence (AI) model using the edge device data as input;
   generate a remote AI model parameter in response to the training; and
   provide the remote AI model parameter to a ledger node to generate a new block of a ledger data structure based on the remote AI model parameter,
   wherein the edge device data stored in the memory is inaccessible by the ledger node.

9. The apparatus of claim 8, wherein the processing circuitry is further configured to encrypt the remote AI model parameter and send the encrypted remote AI model parameter to the ledger node to generate the new block.

10. The apparatus of claim 8, wherein the processing circuitry is further configured to provide device health data indicating health of at least one edge device or at least one remote learning device to the ledger node to generate the new block.

11. A method comprising:
    training a remote artificial intelligence (AI) model using edge device data from at least one edge device as input;
    generating one or more remote AI model parameters in response to the training using at least one remote learning device; and
    generating a new block of a ledger data structure using a ledger node based on the one or more remote AI model parameters,
    wherein the edge device data received by the at least one remote learning device is inaccessible by the ledger node.

12. The method of claim 11, further comprising generating a composite AI model based on the one or more remote AI model parameters stored in the ledger data structure.

13. The method of claim 11, wherein generating the new block is further based on data corresponding to one or more blocks in the ledger data structure.

14. The method of claim 11, wherein the new block is generated further based on transfer data corresponding to the transfer of data from a source node to a destination node, the transfer data comprising: a source node address and a destination node address.

15. The method of claim 11, further comprising:
    encrypting the one or more remote AI model parameters; and
    sending one or more encrypted remote AI model parameters to the ledger node to generate the new block.

16. The method of claim 11, wherein the new block is generated further based on device health data indicating health of the at least one edge device or the at least one remote learning device.

17. The method of claim 16, further comprising a device health analysis node, wherein the ledger node is configured to send at least part of the ledger data structure including the device health data to the device health analysis node remote from the ledger node, the at least one remote learning device being inaccessible by the device health analysis node.

* * * * *